Oct. 3, 1944.   J. T. L. BROWN   2,359,727

ELECTRIC POWER CONVERSION

Filed May 22, 1943

INVENTOR
J.T.L. BROWN
BY
John A Hall
ATTORNEY

Patented Oct. 3, 1944

2,359,727

UNITED STATES PATENT OFFICE 2,359,727

ELECTRIC POWER CONVERSION

John T. L. Brown, Short Hills, N. J., assignor to Bell Telephone Laboratories, Incorporated, New York, N. Y., a corporation of New York Application May 22, 1943, Serial No. 488,024

4 Claims. (Cl. 171—97)

This invention relates to electrical power conversion and particularly to means for producing a comparatively high voltage direct current from a comparatively low voltage direct current source.

The object of the invention is to provide rugged, simple and economical means for stepping up the potential of a direct current source. In one practical application of the present invention it is desired to operate a radio receiver or transmitter from an ordinary automotive storage battery. Heretofore this has been done by first producing an alternating current, transforming this to a higher potential alternating current and then rectifying such high potential current.

In accordance with the present invention this last step has been eliminated in effect by the use of a novel arrangement of transformers in combination with vibrators which will operate reliably in a predetermined manner.

In general a transformer having a mid-tap for both its primary and secondary windings is employed in combination with a pair of vibrators which will alternately close circuits through the different halves of the windings. Where the vibrators have simple transfer contacts and are operated at a given frequency related to the constants of the electrical circuit both the input to the primary and the output from the secondary appear as a series of unidirectional square wave impulses with spaces between them corresponding to open time. These spaces may be decreased until both the input and output are for practical purposes equivalent to direct currents.

However, the difficulty of providing contact arrangements where the open time between transfer operations approaches zero is great from a practical standpoint. Hence it is the object of the present invention to employ overlapping contact arrangements so that a circuit through either half of a primary or secondary winding will at all times be closed and there will be short intervals during which circuits through both halves will be closed. In order to avoid the ill effects of such overlapping connections compensating means are provided whereby the output of the device will be a direct current of uniform potential. Applicant achieves this desideratum in several ways.

In one embodiment of the invention compensation is provided by the use of an auxiliary transformer having one winding in the input direct current path and another winding in the output direct current path, this transformer having the same winding ratio as the main transformer. By this means the current in the input and in the output circuit is in each case held at the same value during the overlapping interval as at times when there is no overlapping circuit connections. Arrangements of this nature show an output of direct current of uniform potential characterized by the inclusion of some inconsequential transients at the beginning and the end of the overlapping periods. For practical purposes then a direct current of uniform potential is produced.

In accordance with another embodiment of the invention an arrangement which is essentially equivalent to that just described is employed. Here a single transformer is used. It is wound in such a way that good coupling exists between each primary half and the secondary half associated with it, but relatively poor coupling exists between other primary-secondary half combinations. This is accomplished, for instance, by using a core type construction, winding the different half combinations on separate legs.

A feature of the invention is a transformer circuit controlled by a plurality of sets of transfer contacts arranged to operate in synchronism in combination with compensating means for preventing change in current values during overlapping periods of circuit establishment.

Another feature of the invention is means to derive a high potential direct current from a low potential direct current source comprising a transformer controlled by synchronously operating sets of transfer contacts.

Other features will appear hereinafter.

The drawing consists of a single sheet having seven figures as follows.

Figure 1:
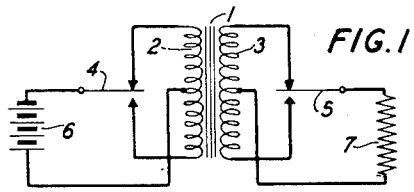
Fig. 1 is a schematic circuit diagram used for purposes of explanation.
Figure 1A:
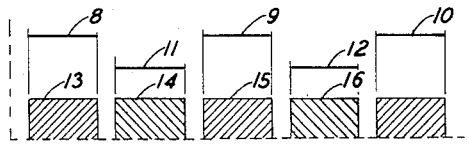
Fig. 1A is a graphical illustration of what happens during the operation of the circuit of Fig. 1.

In certain situations such as in mobile equipment where only a low voltage direct current source is available it is necessary to have a supply of comparatively high voltage direct current. It is usual to provide this by deriving a low voltage alternating current from the available source, by transforming this to a comparatively high voltage alternating current and to then rectify this to derive the necessary high voltage direct current. Fig. 1 shows a means for doing this, comprising essentially a transformer I, having a mid-tap primary 2 and a mid-tap secondary 3. This is connected in a circuit with two contact sets 4 and 5 which are arranged to operate simultaneously, that is, when the contact 4 is in a position to connect the battery 6 to the upper half of the primary 2 the contact 5 will be in a position to connect the load 7 to the corresponding upper half of the secondary 3. In Fig. 1A the marks 8, 9 and 10 represent the time intervals during which the upper halves of the transformer are in circuit and the marks 11 and 12 represent the time intervals during which the lower halves of the transformer are in circuit. The result is a series of square-topped impulses 13 to 17 flowing through the load circuit 7. This requires certain electrical smoothing and noise reducing circuit elements to be added and which being well-known are not shown here.

Figure 2:
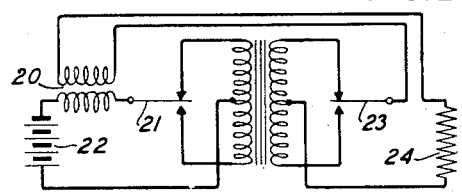
Fig. 2 is a schematic circuit diagram embodying one feature of the present invention.
Figure 2A:
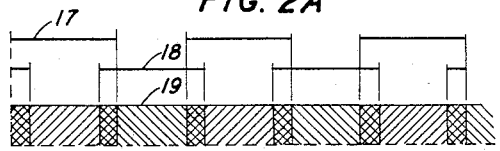
Fig. 2A is a graphical illustration of the action of the circuits embodying the present invention.
Figure 2B:
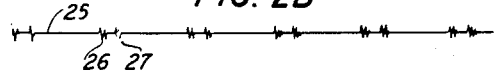
Fig. 2B is a graphical illustration of the output current of the various systems employing the present invention.

In accordance with the present invention the simultaneously operating transfer switches are arranged on a make-before-break basis so that as seen in Fig. 2A the time intervals 17, 18, etc. overlap each other. In this case the tops of the square-topped impulses should form a continuous straight line 19 which would represent a steady direct current. In order to achieve this desirable result an auxiliary transformer is included in the circuit with its primary in circuit with the transfer switch 21 and the low voltage battery 22 and its secondary in circuit with the transfer switch 23 and the load circuit 24. As the current in the primary circuit is increased during the overlapping interval the current in the secondary circuit is decreased so that the final result is a direct current of practically uniform value. Fig. 2B is a representation of an oscillographic trace of the output current, the line 25 showing, in general, a steady value with a series of inconsequential transients 26 and 27 as the beginning and end of the overlapping periods. It has been found that where the synchronization of the two transfer contact sets is very good these transients may be ignored. Actually the transients are due to imperfect synchronization of the overlaps, which must be expected in commercial apparatus. From a theoretical standpoint the transients may be reduced to the point where they are of no consequence but practically some filtering is required.

Figure 3:
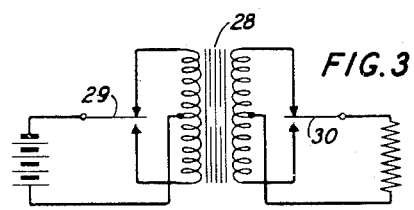
Fig. 3 is a schematic circuit diagram embodying another feature of the present invention.
Figure 4:
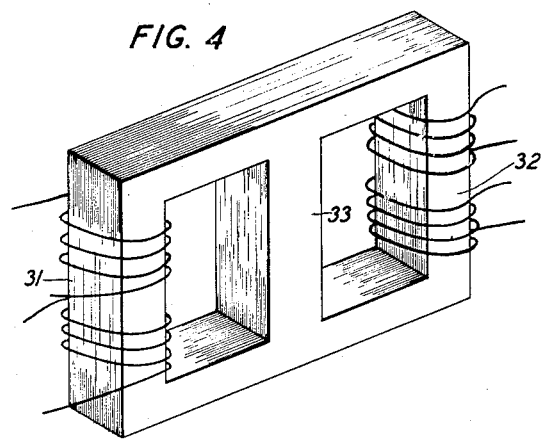
Fig. 4 is a perspective schematic view showing a transformer construction which may be used in the circuit of Fig. 3.

In Fig. 3 another modification is shown, in which there is good coupling between the upper primary and upper secondary of transformer 28 and equally good coupling between the lower primary and the lower secondary of this transformer. The coupling between any upper winding and any lower winding is, however, relatively poor so that during the overlapping periods of the contact sets 29 and 30 the value of the output current will remain steady.

Figure 5:
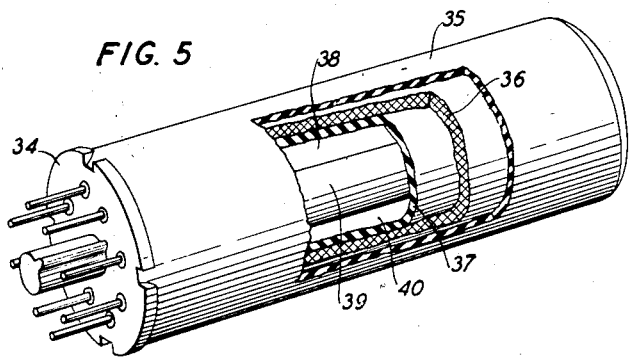
Fig. 5 is a perspective view partly broken away showing a relay construction for operating the contacts of Figs. 1, 2, 3 and 4.

A transformer of this nature is illustrated in Fig. 5 where one primary and its corresponding secondary are wound on the left-hand leg 31 of the transformer core and the other two windings are wound on the right-hand leg 32 of the transformer core. Due to the intervention of the middle leg 33 the coupling between a winding on leg 31 and a winding on leg 32 is relatively poor.

This invention is intended for use by way of example in a radio set in an automobile. Hence the simultaneously operating switches are embodied in a form similar in superficial appearance to the familiar radio tube. Such a device is shown in Fig. 6. Here a base 34 with a sufficient number of contact pins is provided and the switches are protected with a metal case 35. Inside there is a coil 36 wound on a bobbin 37 inside of which are nested three glass sealed contact units 38, 39 and 40. One of these may be an interrupter for controlling the winding and the other two are transfer contact devices as shown in the various figures above.

An alternative arrangement which will be clearly understood without further illustration is to have two such devices, one merely housing an interrupter contact and acting to control the other which houses the two sets of transfer contacts.

What is claimed is:

1. Means for deriving a comparatively high potential direct current from a comparatively low potential direct current source comprising a transformer arrangement having a pair of primary windings and a corresponding pair of secondary windings, a pair of synchronously operating contact sets one for switching from one primary winding to the other and another for switching from one secondary winding to the other, said contact sets arranged for overlap in the circuit connections established thereby.

2. Means for deriving a comparatively high potential direct current from a comparatively low potential direct current source comprising a transformer arrangement having a pair of primary windings and a corresponding pair of secondary windings, a pair of synchronously operating make-before-break contact sets one for switching from one primary winding to the other and another for switching from one secondary winding to the other, and compensating means for maintaining the values of the currents in said primary and secondary circuits during the overlapping periods of said contact sets.

3. Means for deriving a comparatively high potential direct current from a comparatively low potential direct current source comprising a transformer having a mid-tap primary and a mid-tap secondary winding, a pair of synchronously operating continuity transfer contact sets one for switching from one half of said primary winding to the other half thereof and another for switching from a corresponding one-half of said secondary winding to the other half thereof, and a second transformer having the same ratio of transformation as said first transformer, the primary of said second transformer being in the primary winding circuit of said first transformer and the secondary of said second transformer being in the secondary winding circuit of said first transformer.

4. Means for deriving a comparatively high potential direct current from a comparatively low potential direct current source comprising a transformer having a pair of primary and corresponding secondary windings, said transformer being so constructed and arranged that good coupling exists between each primary winding and its associated secondary winding and relatively poor coupling exists between other primary-secondary winding combinations, a pair of synchronously operating continuity transfer contact sets for switching from one of said primary windings to the other and another for simultaneously switching from a corresponding one of said secondary windings to the other.

JOHN T. L. BROWN.